US011411978B2

(12) United States Patent
Norrie (10) Patent No.: US 11,411,978 B2
(45) Date of Patent: Aug. 9, 2022

(54) SYSTEM AND METHOD FOR IMPLEMENTING DISCRIMINATED CYBERSECURITY INTERVENTIONS

(71) Applicant: CyberConIQ, Inc.

(72) Inventor: James L. Norrie, York, PA (US)

(73) Assignee: CyberConIQ, Inc., York, PA (US)

( * ) Notice: Subject to any disclaimer, the term of this patent is extended or adjusted under 35 U.S.C. 154(b) by 289 days.

(21) Appl. No.: 16/534,269

(22) Filed: Aug. 7, 2019

(65) Prior Publication Data

US 2021/0044611 A1    Feb. 11, 2021

(51) Int. Cl.
*H04L 29/00*     (2006.01)
*H04L 9/40*      (2022.01)
*G06Q 10/06*     (2012.01)

(52) U.S. Cl.
CPC ..... *H04L 63/1433* (2013.01); *G06Q 10/0635* (2013.01); *H04L 63/083* (2013.01); *H04L 63/101* (2013.01); *H04L 63/20* (2013.01)

(58) Field of Classification Search
CPC ............ G06Q 10/0635; H04L 63/1433; H04L 63/083; H04L 63/101; H04L 63/20; H04L 63/1441
See application file for complete search history.

(56) References Cited

U.S. PATENT DOCUMENTS

| 7,278,163 | B2 | 10/2007 | Banzhof et al. |
| 8,478,708 | B1 * | 7/2013 | Larcom ................. G06Q 10/10 706/52 |
| 9,280,911 | B2 | 3/2016 | Sadeh-Koniecpol et al. |
| 9,516,010 | B1 * | 12/2016 | Avital .................. H04L 63/083 |
| 9,558,677 | B2 * | 1/2017 | Sadeh-Koniecpol ....... G06F 21/567 |
| 9,870,715 | B2 | 1/2018 | Sadeh-Koniecpol et al. |
| 2005/0102534 | A1 | 5/2005 | Wong |
| 2006/0117388 | A1 * | 6/2006 | Nelson ................. G06F 21/577 726/25 |

(Continued)

FOREIGN PATENT DOCUMENTS

WO    2015123544 A1    8/2015

OTHER PUBLICATIONS

Search Report, Intellectual Property Office, dated Dec. 8, 2020, 4 pages.

(Continued)

*Primary Examiner* — Don G Zhao
(74) *Attorney, Agent, or Firm* — Barley Snyder (57) ABSTRACT

A system for implementing discriminated cybersecurity interventions in a population of users includes a prompt module presenting a plurality of prompts including a first prompt set corresponding to a risk assessment and a second prompt set corresponding to a rule assessment, a response module receiving a first response set corresponding to the first prompt set and a second response set corresponding to the second prompt set from a user of the population of users, an evaluation module determining a first score of the user corresponding to the first response set and the risk assessment and determining a second score of the user corresponding to the second response set and the rule assessment, and an intervention module implementing a discriminated cybersecurity intervention for the user based on the first score and the second score.

24 Claims, 8 Drawing Sheets

(56) References Cited

U.S. PATENT DOCUMENTS

| | | | | |
|---|---|---|---|---|
| 2008/0047017 | A1* | 2/2008 | Renaud | G06F 21/577 |
| | | | | 726/25 |
| 2009/0088133 | A1* | 4/2009 | Orlassino | H04L 63/08 |
| | | | | 455/411 |
| 2012/0255022 | A1* | 10/2012 | Ocepek | H04L 63/1433 |
| | | | | 726/25 |
| 2013/0144785 | A1* | 6/2013 | Karpenko | G06Q 20/425 |
| | | | | 705/44 |
| 2013/0218765 | A1* | 8/2013 | Hammad | G06Q 20/384 |
| | | | | 705/41 |
| 2014/0316797 | A1* | 10/2014 | Biernacki | G16H 20/10 |
| | | | | 705/2 |
| 2015/0356477 | A1 | 12/2015 | Milkman et al. | |
| 2016/0203402 | A1 | 7/2016 | Hanlon | |
| 2016/0205126 | A1* | 7/2016 | Boyer | H04L 61/2007 |
| | | | | 726/25 |
| 2016/0283883 | A1 | 9/2016 | Balestrieri et al. | |
| 2016/0306965 | A1* | 10/2016 | Iyer | G06Q 10/105 |
| 2016/0330236 | A1* | 11/2016 | Reddy | H04L 63/1425 |
| 2018/0182008 | A1* | 6/2018 | Barday | G06Q 10/063114 |
| 2018/0255084 | A1* | 9/2018 | Kotinas | G06K 9/6218 |
| 2018/0375892 | A1* | 12/2018 | Ganor | H04L 63/20 |
| 2019/0050766 | A1* | 2/2019 | Barday | G06Q 10/067 |
| 2020/0106790 | A1* | 4/2020 | Bagnall | G06F 16/23 |

OTHER PUBLICATIONS

Safa, Nader Sohrabi, et al, "Information security policy compliance model in organizations", Computers & Security 56 (2016) 1-13, dated Oct. 17, 2015, 13 pages.

Parsons, Kathryn, et al., "The Human Aspects of Information Security Questionnaire (HAIS-Q): Two Further Validation Studies", Computers & Security 66 (2017), 40-51, dated Jan. 5, 2017, 12 pages.

Parsons, Kathryn, et al., "Determining employee awareness using the Human Aspects of Information Security Questionnaire (HAIS-Q)", Computers & Security 42 (2014), 165-176, dated Dec. 23, 2013, 12 pages.

* cited by examiner

QUESTION/SCORING

Q.# X Q DIMENSION:RISK AVERSE

| Q.# | X | Q | Question | DISAGREE 1 | 2 | 3 | 4 | 5 | AGREE 6 |
|---|---|---|---|---|---|---|---|---|---|
| 1. | | | ONCE A CRIMINAL, ALWAYS A CRIMINAL, I SAY! | -1 | -2 | -3 | -4 | -5 | -6 |
| 2. | x1 | | FOLLOWING THE RULES IS MORE IMPORTANT THAN GETTING BETTER RESULTS. | -1 | -2 | -3 | -4 | -5 | -6 |
| 3. | | | HAVING FUN IS IMPORTANT, BUT I ALWAYS PUT SAFETY FIRST! | -1 | -2 | -3 | -4 | -5 | -6 |
| 4. | | | SOMETIMES WE NEED TO BREAK THE RULES BEFORE WE CAN FIX THE RULES | -6 | -5 | -4 | -3 | -2 | -1 |
| 5. | x5 | | THE MORE PERFECT MY WORK, THE MORE I AM RESPECTED FOR IT. | -1 | -2 | -3 | -4 | -5 | -6 |
| 6. | x3 | | I TYPICALLY DRIVE AT OR BELOW THE POSTED SPEED LIMIT. | -1 | -2 | -3 | -4 | -5 | -6 |
| 7. | | | IF ASKED TO DO SOMETHING UNETHICAL OR ILLEGAL, I WOULD IMMEDIATELY RESIGN. | -1 | -2 | -3 | -4 | -5 | -6 |
| 8. | | | IF A GAME HAS MANY RULES, I TEND TO FORGET, IGNORE OR CHANGE THEM. | -6 | -5 | -4 | -3 | -2 | -1 |
| 9. | x9 | | I PREFER PLAYING INDIVIDUAL SPORTS OVER TEAM SPORTS. | -6 | -5 | -4 | -3 | -2 | -1 |
| 10. | x4 | | STRICTLY FOLLOWING THE LAW MAKES YOU A BETTER PERSON WHO DESERVES MORE RESPECT. | -1 | -2 | -3 | -4 | -5 | -6 |

Q.# X Q DIMENSION:RISK TOLERANT

| Q.# | X | Q | Question | DISAGREE 1 | 2 | 3 | 4 | 5 | AGREE 6 |
|---|---|---|---|---|---|---|---|---|---|
| 1. | x2 | | TAKING RISKS TO DEMONSTRATE CREATIVITY AND INNOVATION IS ALWAYS WORTH IT. | 1 | 2 | 3 | 4 | 5 | 6 |
| 2. | | | ADOLESCENTS SHOULD BE GIVEN FREEDOM TO DISCOVER AND EXPLORE ON THEIR OWN. | 1 | 2 | 3 | 4 | 5 | 6 |
| 3. | x6 | | I TYPICALLY TRAVEL WITH THE SPEED OF TRAFFIC RATHER THAN AT THE POSTED SPEED LIMIT. | 1 | 2 | 3 | 4 | 5 | 6 |
| 4. | x10 | | DO YOU AGREE WITH THE PHRASE? "WHAT THEY DON'T KNOW, WON'T HURT THEM". | 1 | 2 | 3 | 4 | 5 | 6 |
| 5. | x5 | | TAKING SHORT-CUTS IN ORDER TO GET AHEAD IS OKAY WITH ME. | 1 | 2 | 3 | 4 | 5 | 6 |
| 6. | | | DO YOU AGREE WITH THE PHRASE? "I'D RATHER ASK FOR FORGIVENESS THAN FOR PERMISSION". | 1 | 2 | 3 | 4 | 5 | 6 |
| 7. | | | IN GAMES OF CHANCE, I ALWAYS WANT TO KNOW THE ODDS BEFORE I PLAY. | 6 | 5 | 4 | 3 | 2 | 1 |
| 8. | | | ORGANIZATIONS SHOULD ENCOURAGE "WHISTLE-BLOWERS" TO HELP KEEP THEM HONEST. | 6 | 5 | 4 | 3 | 2 | 1 |
| 9. | x9 | | IF EVERYONE CHEATS TO WIN, THEN I NEED TO CHEAT TOO! | 1 | 2 | 3 | 4 | 5 | 6 |
| 10. | | | I TRUST EXPERT OPINION MORE THAN MY OWN INTUITION. | 6 | 5 | 4 | 3 | 2 | 1 |

FIG. 3B

QUESTION/SCORING {482}

DIMENSION: RULE ABIDING {486b}

| Q.# | X Q | Question | DISAGREE 1 | 2 | 3 | 4 | 5 | AGREE 6 |
|---|---|---|---|---|---|---|---|---|
| 1. | x1 | EDUCATION, LICENSES OR CERTIFICATIONS ARE MORE IMPORTANT THAN JOB EXPERIENCE. | -1 | -2 | -3 | -4 | -5 | -6 |
| 2. | x6 | IN MY DREAM JOB, I WOULD GET TO MAKE ALL THE RULES AND BE ENTIRELY SELF-DIRECTED. | -6 | -5 | -4 | -3 | -2 | -1 |
| 3. | x4 | MY JOB IS WELL DEFINED AND I PRIDE MYSELF IN FOLLOWING THE RULES. | -6 | -5 | -4 | -3 | -2 | -1 |
| 4. |  | I AM A TEAM PLAYER WHO WORKS CLOSELY WITH OTHERS AND MY SUPERVISOR. | -1 | -2 | -3 | -4 | -5 | -6 |
| 5. |  | THE MORE PERFECT MY WORK, THE MORE I AM APPRECIATED AND REWARDED. | -1 | -2 | -3 | -4 | -5 | -6 |
| 6. | x10 | IF I DON'T KNOW WHAT TO DO, I ALWAYS SEEK MY BOSS' ADVICE BEFORE ACTING. | -1 | -2 | -3 | -4 | -5 | -6 |
| 7. |  | THERE IS TRUTH TO THE PHRASE: "SPARE THE ROD, SPOIL THE CHILD." | -1 | -2 | -3 | -4 | -5 | -6 |
| 8. | x5 | I HAVE GOOD INSTINCTS. HIRE GREAT PEOPLE, THEN TRUST THEM TO DO THEIR JOBS. | -6 | -5 | -4 | -3 | -2 | -1 |
| 9. |  | NEW EMPLOYEES NEED TO BE CLOSELY SUPERVISED UNTIL WE CAN TRUST THEM. | -1 | -2 | -3 | -4 | -5 | -6 |
| 10. |  | I ALWAYS READ EVERYTHING I SIGN BEFORE AFFIXING MY SIGNATURE. | -1 | -2 | -3 | -4 | -5 | -6 |

DIMENSION: RULE BREAKING {486a}

| Q.# | X Q | Question | DISAGREE 1 | 2 | 3 | 4 | 5 | AGREE 6 |
|---|---|---|---|---|---|---|---|---|
| 1. | x1 | EXPERIENCE AND PROVEN RESULTS MATTER MORE THAN QUALIFICATIONS IN HIRING. | 1 | 2 | 3 | 4 | 5 | 6 |
| 2. |  | I VALUE WORK-LIFE BALANCE OVER FASTER CAREER ADVANCEMENT. | 6 | 5 | 4 | 3 | 2 | 1 |
| 3. |  | I PRIDE MYSELF IN GETTING RESULTS NO MATTER WHAT IS REQUIRED TO ACHIEVE THEM. | 1 | 2 | 3 | 4 | 5 | 6 |
| 4. | x3 | THE IDEAL JOB FOR ME IS OPEN-ENDED AND UNSTRUCTURED WITH NO TWO DAYS BEING THE SAME. | 1 | 2 | 3 | 4 | 5 | 6 |
| 5. | x8 | I AGREE WITH THE PHRASE: "IF YOU WANT IT DONE RIGHT, DO IT YOURSELF." | 1 | 2 | 3 | 4 | 5 | 6 |
| 6. | x2 | MY DREAM JOB WOULD GIVE ME REAL POWER AND COMPLETE AUTHORITY. | 6 | 5 | 4 | 3 | 2 | 1 |
| 7. |  | KEEPING THE CUSTOMER SATISFIED IS MORE IMPORTANT THAN FOLLOWING THE RULES... | 1 | 2 | 3 | 4 | 5 | 6 |
| 8. |  | I AGREE: "SOME RULES JUST NEED TO BE BROKEN." | 1 | 2 | 3 | 4 | 5 | 6 |
| 9. |  | I AGREE: "THERE IS NO EXCUSE FOR BREAKING THE LAW..." | 6 | 5 | 4 | 3 | 2 | 1 |
| 10. | x6 | IF THE RULE BOOK DOESN'T SAY I CAN'T, THEN I ASSUME THAT I CAN. | 1 | 2 | 3 | 4 | 5 | 6 |

SYSTEM AND METHOD FOR IMPLEMENTING DISCRIMINATED CYBERSECURITY INTERVENTIONS

FIELD OF THE INVENTION

The present invention relates to cybersecurity and, more particularly, to a system and method for implementing discriminated cybersecurity interventions within a user population.

BACKGROUND

Cybersecurity is a critical concern for organizations. Many organizations focus on technological, computer-based implementations to increase cybersecurity of an organizational computer network. Organizations, however, are often more prone to cybersecurity breaches through attacks that target individuals working in the organization which are not directly prevented by these technological efforts. For example, phishing, spear phishing, social engineering, and other forms of third-party cyber-attacks deceive individuals of the organization, as opposed to overcoming technological and computer-based barriers, as a means of gaining illegitimate access to critical data of the organization.

Organizations often cannot determine which individuals are more prone to enabling these cyber-attacks. Consequently, organizations commonly apply cybersecurity interventions, including training and restricting or limiting access and control, universally across the population of individuals of the organization. The universal application of cybersecurity measures misallocates resources; individuals, for example, are all required to spend the same time in the same generic training regardless of the likely cybersecurity risk posed by that individual. Research validates that impersonal and general cybersecurity presentations fail to impact behavior of many individuals in the organization. Further, the universal application of most high level cybersecurity tracking, access and control measures is prohibitively expensive and time-consuming. So, the cybersecurity measures that are most commonly implemented presently misallocate resources while omitting the personalization necessary to detect and change the on-the-job behavior of particularly high-risk individuals in the population.

SUMMARY

A system for implementing discriminated cybersecurity interventions in a population of users includes a prompt module presenting a plurality of prompts including a first prompt set corresponding to a risk assessment and a second prompt set corresponding to a rule assessment, a response module receiving a first response set corresponding to the first prompt set and a second response set corresponding to the second prompt set from a user of the population of users, an evaluation module determining a first score of the user corresponding to the first response set and the risk assessment and determining a second score of the user corresponding to the second response set and the rule assessment, and an intervention module implementing a discriminated cybersecurity intervention for the user based on the first score and the second score.

BRIEF DESCRIPTION OF THE DRAWINGS

The invention will now be described by way of example with reference to the accompanying Figures, of which:

FIG. 3A is a schematic diagram of a plurality of prompts and a plurality of responses used in the process of FIG. 2;

FIG. 3B is a schematic diagram of another plurality of prompts and another plurality of responses used in the process of FIG. 2;

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept to those skilled in the art.

Figure 1:
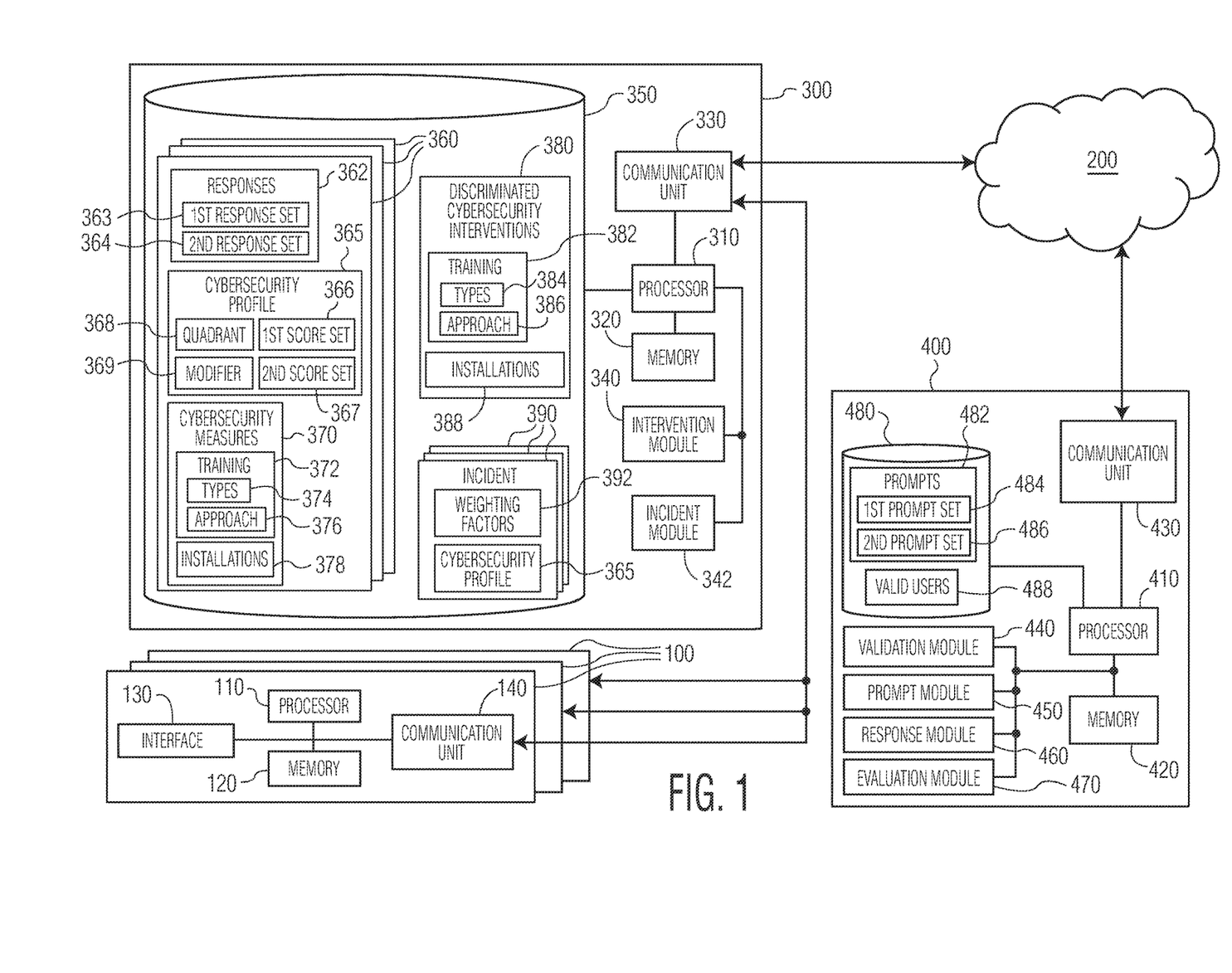
FIG. 1 is a block diagram of a system for implementing cybersecurity interventions according to an embodiment.

A system for implementing cybersecurity interventions according to an embodiment, as shown in FIG. 1, includes a plurality of user devices 100 accessing a network 200 through an organization system 300 and a test system 400 communicating with the user devices 100 and the organization system 300 over the network 200.

A population of users of an organization have and operate the plurality of user devices 100 shown in FIG. 1. The organization of the population of users controls the organization system 300. In an embodiment, the population of users are employees of the organization employer. In other embodiments, the population of users may be any members of an organization or simply individuals that permits access of the user devices 100 of the population to the organization system 300 and exercises cybersecurity control over the user devices 100.

The plurality of user devices 100, as shown in FIG. 1, may each be a desktop, a laptop, a tablet, a mobile device, or any other computing device known to those with ordinary skill in the art. As shown in FIG. 1, all of the user devices 100 have the same components, and the plurality of user devices 100 will be described in greater detail below with reference to a single user device 100. In various embodiments, each of the users of the population may have one of the user devices 100, each of the users of the population may have multiple of the user devices 100, or users of the population may have different numbers of user devices 100.

As shown in FIG. 1, each of the user devices 100 includes a user processor 110, a user memory 120 connected to the user processor 110, an interface 130 connected to the user processor 110, and a user communication unit 140 connected to the user processor 110. In various embodiments, the plurality of user devices 100 may vary in type provided that they each have the user processor 110, the user memory 120, the interface 130, and the user communication unit 140.

The user memory 120 is a non-transitory computer readable medium, such as read-only memory (ROM) or random access memory (RAM), capable of storing program instructions thereon that are executable by the user processor 110 to perform the functions of the user processor 110 described herein. The interface 130 is capable of receiving input data and outputting data and, in various embodiments, may be a display and keyboard, an input-output touch screen, or any type of computing interface known to those with ordinary skill in the art. The user communication unit 140 is capable of receiving and transmitting data to and from the user device 100. In various embodiments, the user communication unit 140 may be capable of communicating over a wired connection, a wireless connection, by near field communication, or by any other data communication of computing devices known to those with ordinary skill in the art.

The user device 100, as shown in FIG. 1, communicates through the organization system 300 to access the network 200. In various embodiments, the network 200 may be the Internet or may be a network of the organization.

The organization system 300, as shown in FIG. 1, includes an organization processor 310, an organization memory 320 connected to the organization processor 310, an organization communication unit 330 connected to the organization processor 310, and an organization database 350 connected to the organization processor 310.

Figure 6:
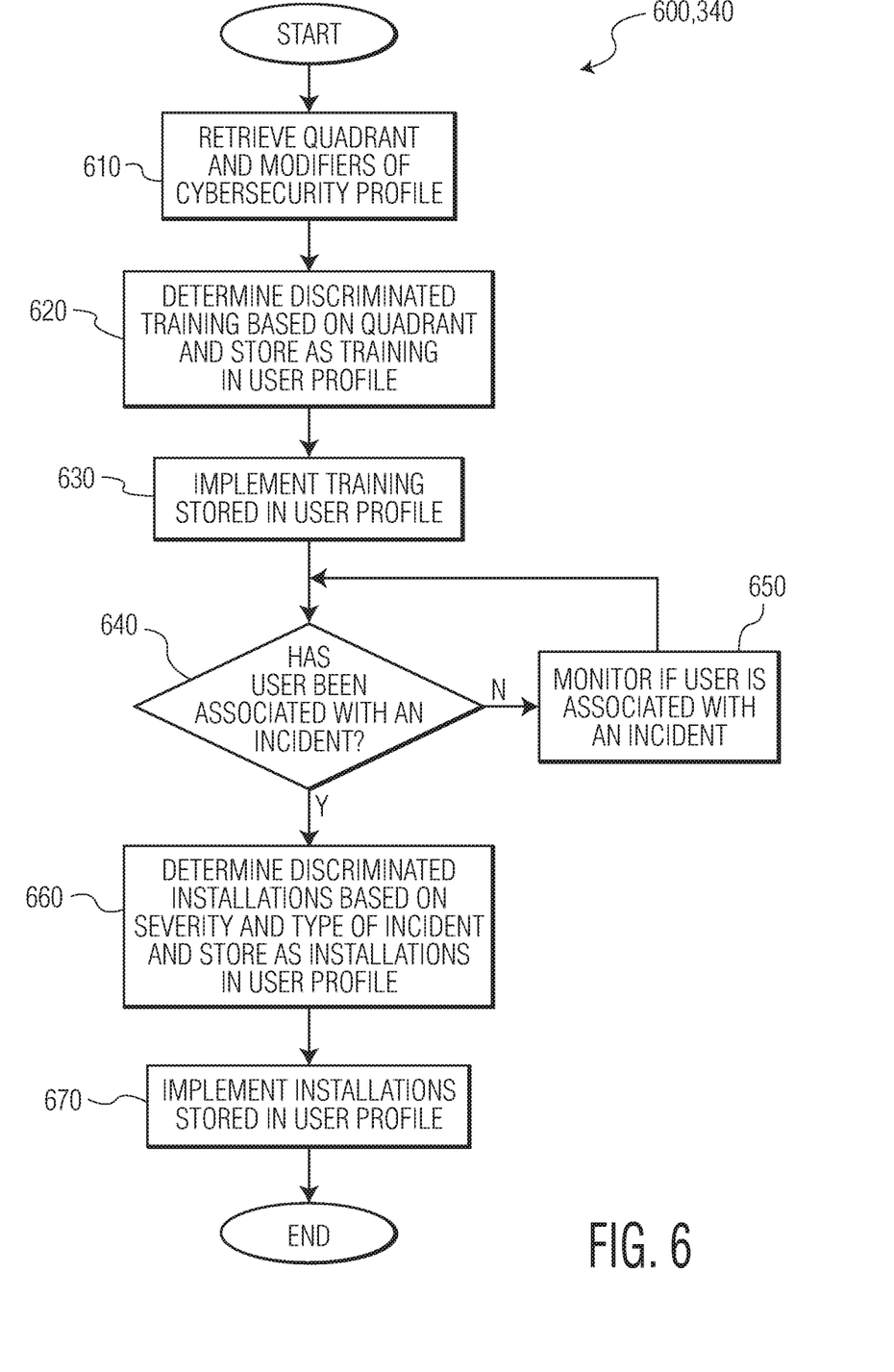
FIG. 6 is a flowchart of a process for implementing cybersecurity interventions using the system of FIG. 1.
Figure 7:
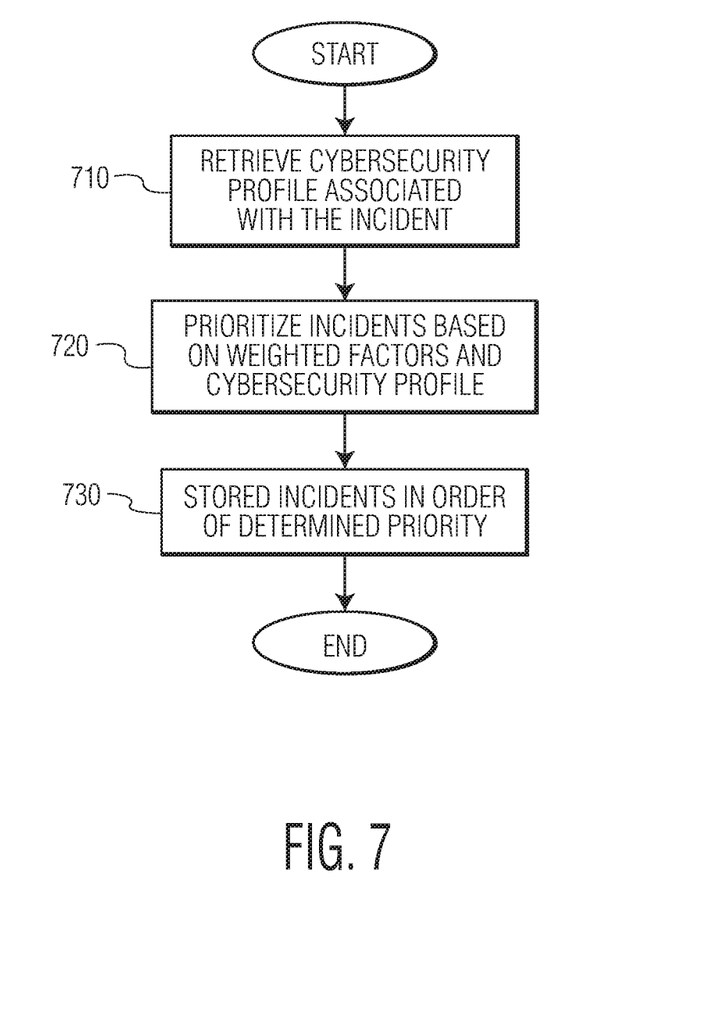
FIG. 7 is a flowchart of a process for prioritizing cybersecurity investigations using the system of FIG. 1.

The organization memory 320 is a non-transitory computer readable medium, such as ROM or RAM, capable of storing computer instructions thereon that are executable by the organization processor 310 to perform the functions of the organization processor 310 described herein. As shown in FIG. 1, the organization system 300 includes an intervention module 340 and an incident module 342 that, as described in greater detail below with reference to FIGS. 6 and 7, are each a set of functions performed when a set of computer instructions stored on the organization memory 320 are executed by the organization processor 310.

The organization communication unit 330 is capable of receiving and transmitting data to and from the organization system 300. In various embodiments, the organization communication unit 330 may be capable of communicating over a wired connection, a wireless connection, by near field communication, or by any other data communication of computing devices known to those with ordinary skill in the art.

The organization database 350 is accessible by the organization processor 310. The organization database 350 is a non-transitory computer readable medium capable of storing data that may be located either locally or remotely from the other elements of the organization system 300. The organization database 350, as shown in FIG. 1, stores a plurality of user profiles 360, a plurality of discriminated cybersecurity interventions 380, and a plurality of incidents 390 that will be described in greater detail below.

The test system 400, as shown in FIG. 1, includes a test processor 410, a test memory 420 connected to the test processor 410, a test communication unit 430 connected to the test processor 410, and a test database 480 connected to the test processor 410. In the shown embodiment, the test system 400 is separate from the organization system 300 and communicates with the organization system 300 over the network 200. In another embodiment, all the elements and functions of the test system 400 described below may be stored and executed within the organization system 300.

The test memory 420 is a non-transitory computer readable medium, such as ROM or RAM, capable of storing computer instructions thereon that are executable by the test processor 410 to perform the functions of the test processor 410 described herein. As shown in FIG. 1, the test system 400 includes a validation module 440, a prompt module 450, a response module 460, and an evaluation module 470 that, as described in greater detail below with reference to FIGS. 2-5, are each a set of functions performed when a set of computer instructions stored on the test memory 420 are executed by the test processor 410.

The test communication unit 430 is capable of receiving and transmitting data to and from the test system 400. In various embodiments, the test communication unit 430 may be capable of communicating over a wired connection, a wireless connection, by near field communication, or by any other data communication of computing devices known to those with ordinary skill in the art.

The test database 480 is accessible by the test processor 410. The test database 480 is a non-transitory computer readable medium capable of storing data that may be located either locally or remotely from the other elements of the test system 400. The test database 480, as shown in FIG. 1, stores a plurality of prompts 482 and a list of valid users 488 that will be described in greater detail below.

A process 500 for determining a cybersecurity risk of each user of the population of users, shown in FIG. 2, will now be described in greater detail. The process 500 will be described with respect to one user but applies equally to each user of the population of users.

Figure 2:
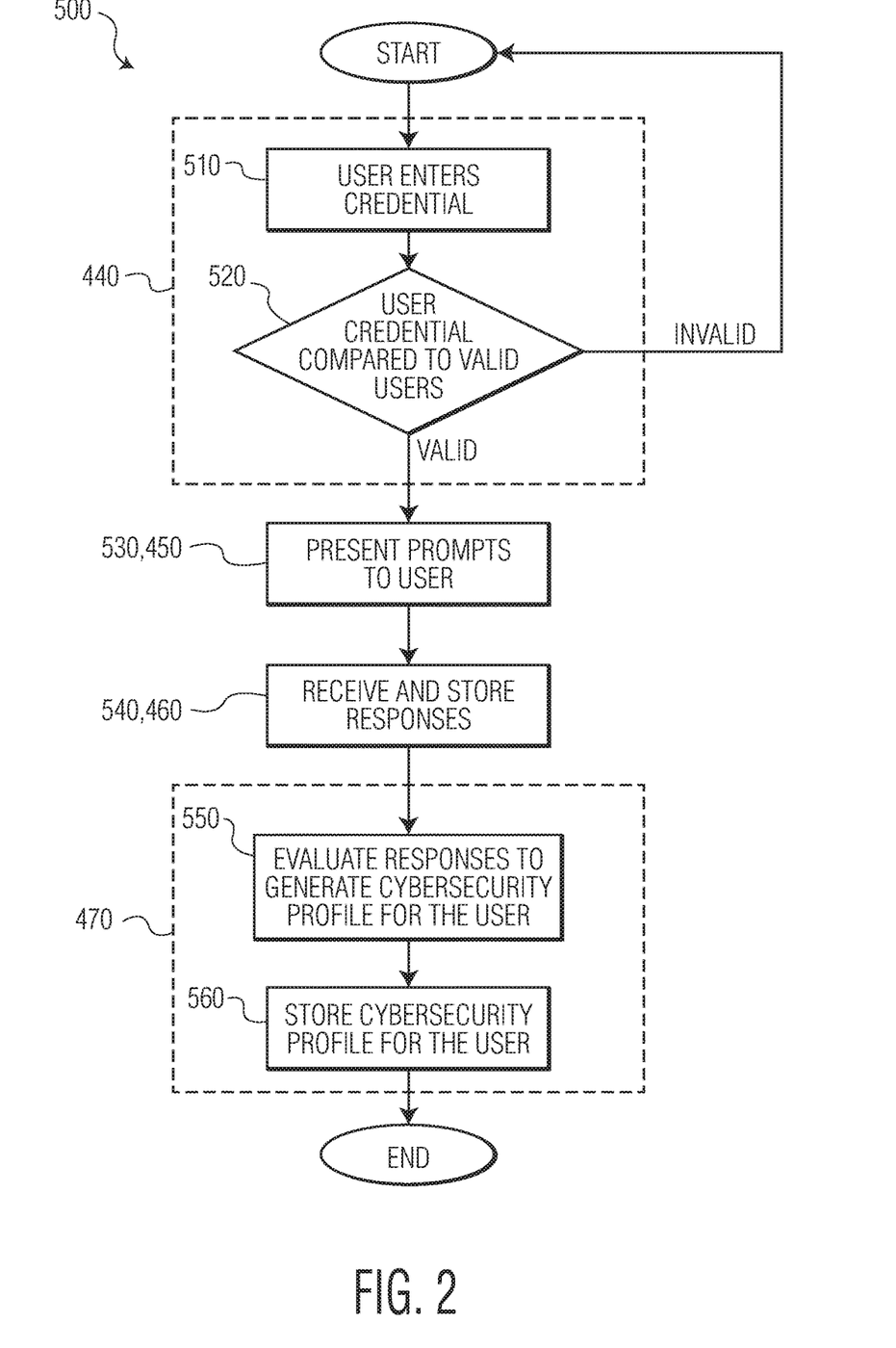
FIG. 2 is a flowchart of a process for determining a cybersecurity risk of each user of a population of users using the system of FIG. 1.

In a credential entry step 510 of the process 500, as shown in FIGS. 1 and 2, the test processor 410 executes the validation module 440 to transmit a validation query to the user device 100. The test processor 410 controls the test communication unit 430 to transmit the validation query to the organization communication unit 430, and the organization processor 310 controls the organization communication unit 330 to transmit the validation query to the user communication unit 140. The user processor 110 receives the validation query and presents the validation query on the interface 130. The user enters a validation credential into the interface 130. The user processor 110 then operates the user communication unit 140 to transmit the validation credential to the organization communication unit 330, and the organization processor 310 operates the organization communication unit 330 to transmit the validation credential to the test communication unit 430.

In a credential comparison step 520 of the process 500, as shown in FIGS. 1 and 2, the test processor 410 executes the validation module 440 to compare the validation credential to the list of valid users 488 stored in the test database 480. If the validation credential matches one of the valid users 488, the process 500 proceeds to a prompt step 530. If the validation credential does not match one of the valid users 488, the process 500 loops back to the start. In an embodiment, the validation credential is only an email address and the valid users 488 is a list of the email addresses of the users of the population. In other embodiments, the validation credential may include data other than the user's email address and/or may include more than one element. In all embodiments, however, the validation credential is an element of non-demographic information of the user and the list of valid users 488 is stored in the test database 480 associated only with the element of non-demographic information of each of the valid users 488. The stored information of the valid users 488 and the validation credential does not include any demographic information of the user, such as age, race, gender, religion, or any other information that could be deemed impermissibly or inappropriately discriminatory.

In the prompt step 530 of the process 500, as shown in FIGS. 1 and 2, the test processor 410 executes the prompt module 450 to present the plurality of prompts 482 to the user. The test processor 410 executes the prompt module 450 to retrieve the plurality of prompts 482 from the test database 480 and, via the test communication unit 430, transmits the plurality of prompts 482 to the organization communication unit 330, which transmits the prompts 482 to the user communication unit 140. The user processor 110 receives the prompts 482 from the user communication unit 140 and presents the prompts 482 to the user on the user interface 130.

As shown in FIG. 1, the prompts 482 stored on the test database 480 include a first prompt set 484 and a second prompt set 486. The first prompt set 484, as shown in FIG. 3A, includes a plurality of prompts corresponding to a risk assessment. The first prompt set 484 includes a positive subset 484a and a negative subset 484b; the positive subset 484a includes prompts directed to risk tolerance, while the negative subset 484b includes prompts directed to risk aversion. In an embodiment, approximately half of the prompts in the positive subset 484a and the negative subset 484b are inter-correlated to test an affirmative and a negative of the same behavior. The second prompt set 486, as shown in FIG. 3B, includes a plurality of prompts corresponding to a rule assessment. The second prompt set 486 includes a positive subset 486a and a negative subset 486b; the positive subset 486a includes prompts directed to rule breaking, while the negative subset 486b includes prompts directed to rule abiding. In an embodiment, approximately half of the prompts in the positive subset 486a and the negative subset 486b are inter-correlated to test an affirmative and a negative of the same behavior.

In an embodiment, all of the prompts 482 of the first prompt set 484 and the second prompt set 486 are presented in a context of detecting on-job behavior rather than general behavioral science terms or trait-based personality theories. For example, in the exemplary embodiment shown in FIGS. 3A and 3B, one of the prompts 482 of the negative subset 484b of the first prompt set 484 is "The more perfect my work, the more I am respected for it" and one prompts of the positive subset 486a of the second prompt set 486 is "Keeping the customer satisfied is more important than following the rules . . . ". The prompts 482 shown in FIGS. 3A and 3B are merely exemplary and, in other embodiments, the prompts 482 may be worded differently or be conceptually different while remaining in the context of focusing measurement of relevant on-the-job behaviors.

In the embodiment shown in FIGS. 3A and 3B, there are forty total prompts 482, with twenty prompts in the first prompt set 482 and twenty prompts and the second prompt set 486. Each of the positive subset 484a and the negative subset 484b of the first prompt set 484 and the positive subset 486a and the negative subset 486b of the second prompt set 486 include ten prompts. In other embodiments, the number of prompts 482 may vary, provided each of the subsets 484a, 484b, 486a, and 486b has the same number of prompts.

With the prompts 482 presented on the interface 130, in a response step 540 of the process 500, the user responds to each of the prompts 482. As shown in FIGS. 3A and 3B, the user enters a response 362 to each prompt 482 on the interface 130 agreeing or disagreeing with the prompt 482 on a six point Likert scale; the response 362 to each prompt 482 is an integer ranging from one to six. The responses 362 include a first response set 363 corresponding to the first prompt set 484 and a second response set 364 corresponding to the second prompt set 486. The first response set 363 includes a positive subset 363a containing responses to the positive subset 484a of the first prompt set 484 and a negative subset 363b containing responses to the negative subset 484b of the first prompt set 484. The second response set 364 includes a positive subset 364a containing responses to the positive subset 486a of the second prompt set 486 and a negative subset 364b containing responses to the negative subset 486b of the second prompt set 486. The responses of the positive subsets 363a, 364a are each a positive integer and the responses of the negative subsets 363b, 364b are each a negative integer.

In the response step 540, the user processor 110 transmits the responses 362 to the organization communication unit 330, and the organization communication unit 330 transmits the responses 362 to the test communication unit 430. The test processor 410 receives the responses 362 and, executing the response module 460, directs the responses 362 to be stored on the organization database 350. As shown in FIG. 1, the organization database 350 stores a plurality of user profiles 360 that each correspond to one of the users of the population. The responses 362 of the user are stored in the user profile 360 with the first response set 363 and the second response set 364.

Figure 4:
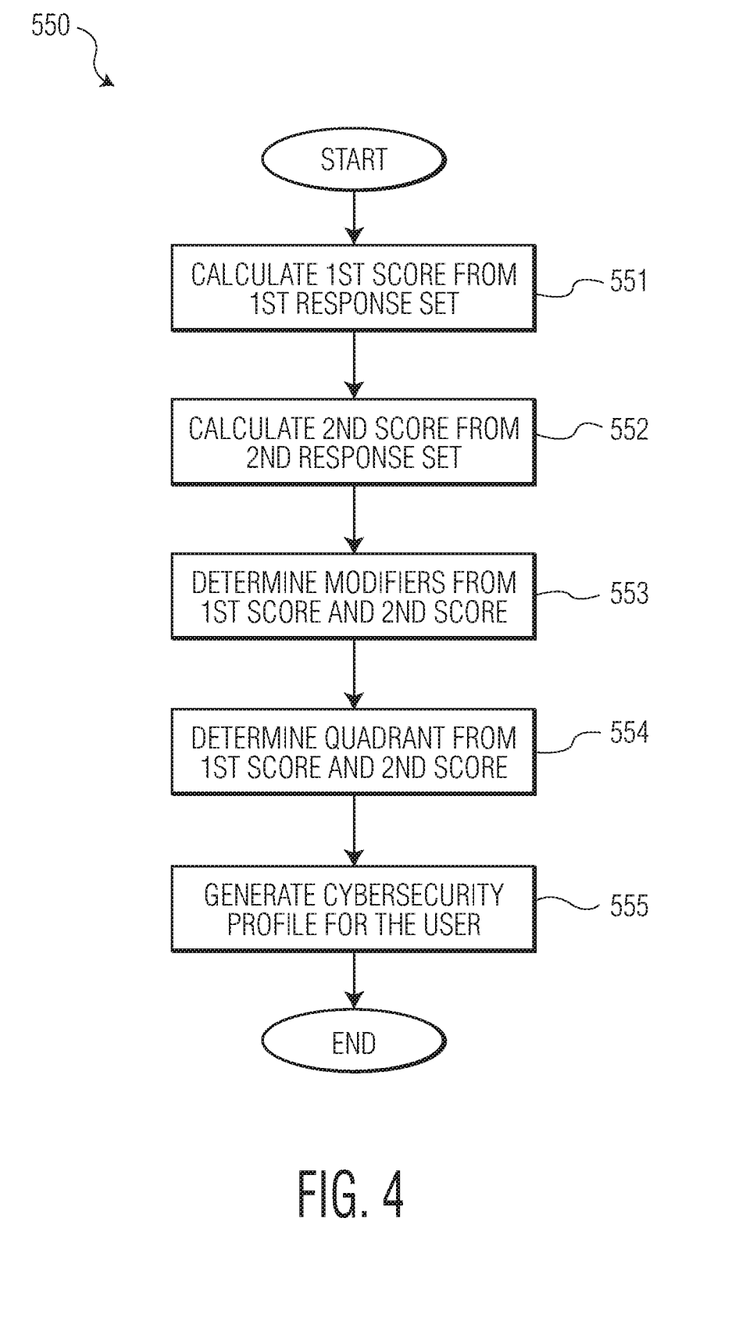
FIG. 4 is a flowchart of a profile generation step of the process of FIG. 2.

In a profile generation step 550, shown in FIGS. 2 and 4, the test processor 410 executes the evaluation module 470 to evaluate the responses 362 of the user and generate a cybersecurity profile 365 for the user. The test processor 410 retrieves the responses 362 of the user from the organization database 350 through the organization communication unit 330 and the test communication unit 430.

As shown in FIG. 4, in a sub-step 551 of the profile generation step 550, the test processor 410 executes the evaluation module 470 to calculate a first score 366 for the user from the first response set 363. The first score 366 corresponds to the first prompt set 484 and therefore corresponds to the user's risk assessment. To calculate the first score 366, the test processor 410 calculates a total sum of the positive subset 363a and the negative subset 363b of the first response set 363. The first score 366 is an integer between −50 and 50.

As shown in FIG. 4, in a sub-step 552 of the profile generation step 550, the test processor 410 executes the evaluation module 470 to calculate a second score 367 for the user from the second response set 364. The second score 367 corresponds to the second prompt set 486 and therefore corresponds to the user's rule assessment. To calculate the second score 367, the test processor 410 calculates a total sum of the positive subset 364a and the negative subset 364b of the second response set 364. The second score 367 is an integer between −50 and 50.

In a sub-step 553 of the profile generating step 550, shown in FIG. 4, the test processor 410 executes the evaluation module 470 to determine a pair of modifiers 369 of the user's cybersecurity profile 365. A first modifier 369a corresponds to the risk assessment and the first score 366 and a second modifier 369b corresponds to the rule assessment and the second score 367. As described above, each of the first score 366 and the second score 367 is an integer between −50 and 50. The test processor 410 determines the modifiers 369 based on a comparison of an absolute value of the first score 366 and the second score 367 to a threshold. If the score 366, 367 is between 3 and 10, the modifier 369 is a "moderate" modifier. That is, the first modifier 369a is "moderate" if the absolute value of the first score 366 is between 3 and 10 and the second modifier 369b is "moderate" if the absolute value of the second score 367 is between 3 and 10. If the score 366, 367 is greater than 10, the modifier 369 is an "extreme" modifier. That is, the first modifier 369a is "extreme" if the absolute value of the first score 366 is greater than 10 and the second modifier 369b is "extreme" if the absolute value of the second score 367 is greater than 10. The test processor 410 determines which of the modifiers 369 corresponds to the first score 366 (the risk assessment) and the second score 367 (the rule assessment) of the user.

Figure 5:
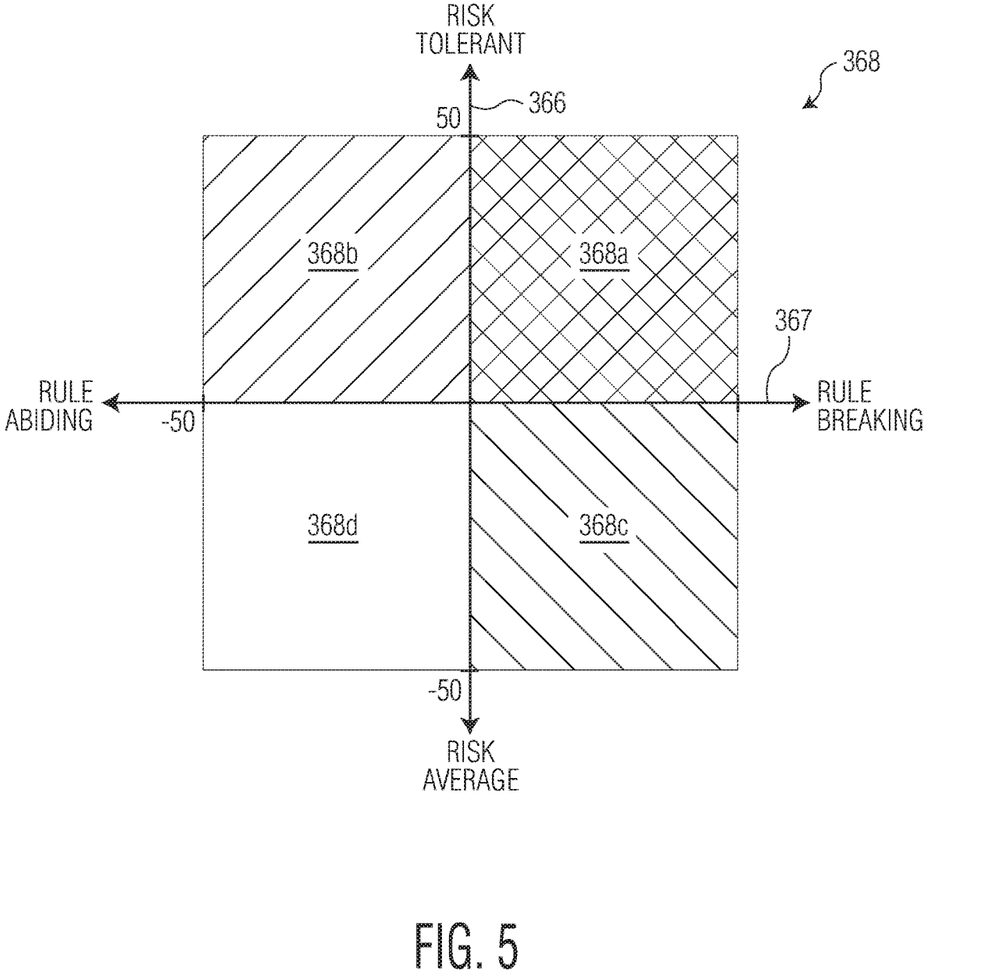
FIG. 5 is a graph of a first score and a second score determining a quadrant in the process of FIG. 4.

In a sub-step 554 of the profile generating step 550, shown in FIG. 4, the test processor 410 executes the evaluation module 470 to determine a quadrant 368 of the user's cybersecurity profile 365. A graph stored on the test memory 420 and shown in FIG. 5 is used to determine the quadrant 368. The test processor 410 plots the first score 366 and the second score 367 on the graph. The first score 366, corresponding to risk assessment, is plotted along the y-axis, and the second score 367, corresponding to the rule assessment, is plotted along the x-axis. As shown in FIG. 5, based on the first score 366 and the second score 367, the quadrant 368 of the user is determined to be one of a first quadrant 368a, a second quadrant 368a, a third quadrant 368c, and a fourth quadrant 368d. The first quadrant 368a corresponds to a positive value of each the first score 366 and the second score 367, the second quadrant 368b corresponds to a positive value of the first score 366 and a negative value of the second score 367, the third quadrant 368c corresponds to a negative value of the first score 366 and a positive value of the second score 367, and the fourth quadrant 368d corresponds to a negative value of each of the first score 366 and the second score 367. The test processor 410 determines which of the quadrants 368a, 368b, 368c, and 368d corresponds to the first score 366 and the second score 367 of the user.

In the sub-step 554, the determination of the quadrant 368 varies if the absolute value of the first score 366 and/or the second score 367, as used to determine the modifiers 369 above, is less than or equal to 2. If the absolute value of either the first score 366 or the second score 367 is less than or equal to 2, the test processor 410 transmits a quadrant prompt to the user communication unit 140 through the test communication unit 430 requesting that the user choose an applicable quadrant 368 along the corresponding axis shown in FIG. 5. For example, if the absolute value of the first score 366 is less than or equal to 2, the user is presented with an option of choosing either "risk tolerant" or "risk averse" along the y-axis shown in FIG. 5. The same applies for the second score 367. If the absolute value of both the first score 366 and the second score 367 are less than or equal to 2, the user is presented with the option of choosing either "risk tolerant" or "risk averse" along the y-axis and either "rule breaking" or "rule abiding" along the x-axis shown in FIG. 5. The user chooses the appropriate quadrant 368 through the interface 130.

In a sub-step 555 of the profile generating step 550, shown in FIG. 4, the test processor 410 executes the evaluation module 470 to generate the cybersecurity profile 365 for the user. The cybersecurity profile 365 for the user includes the first score 366, the second score 367, the quadrant 368, and the modifiers 369.

With the cybersecurity profile 365 generated, the process 500 proceeds to a profile storing step 560 shown in FIG. 2. The test processor 410 executes the evaluation module 470 to transmit the cybersecurity profile 365 for the user through the test communication unit 430 and to the organization communication unit 330. The organization processor 310 stores the received cybersecurity profile 365 in the user profile 360 of the user. The cybersecurity profile 365, according to the process 500 described above, reflects the user's appetite for risk via the risk assessment and rule abiding inclinations via the rule assessment. The process 500 is executed for each user of the population of users and, as shown in FIG. 1, a user profile 360 containing a cybersecurity profile 365 is stored in the organization database 350 for each user of the population of the users.

The user's cybersecurity profile 365 reflects the user's inherent bias towards key on-the-job behaviors known to contribute to or inhibit cybersecurity risk detection and prevention of third-party inspired/directed attacks. An indication, for example, of risk tolerance in the first score 366 indicates that the user is more willing to engage in risky on-job behavior and is therefore more vulnerable to third-party inspired cybersecurity attacks that exploit that tendency. An indication, for example, of rule breaking in the second score 367 indicates that the user is more willing to break rules and is therefore more vulnerable to third-party inspired cybersecurity attacks. The quadrant 368 of the profile 365 combines the risk and rule dimensions of the first score 366 and the second score 367 to indicate whether the user is overall highly prone to a third-party inspired cybersecurity attack in the first quadrant 368a, is somewhat prone to a cybersecurity attack in the second quadrant 368b or the third quadrant 368c, or is minimally prone to a cybersecurity attack in the fourth quadrant 368d. The modifiers 369 further indicate the relative strength or weakness of the quadrant 368 as pertaining to the user. For example, a user profile 365 with a first quadrant 368a and two extreme modifiers 369 is the least receptive to cybersecurity risk detection and prevention and is the most likely to pose a higher overall cybersecurity risk. Conversely, a user profile 365 with a fourth quadrant 368d and two extreme modifiers 369 would be most willing to contribute and adhere to cybersecurity risk detection and prevention and is least likely to pose a cybersecurity risk.

A process 600 for implementing discriminated cybersecurity interventions, shown in FIG. 6, will now be described in greater detail. The process 600 will be described with respect to one user but applies equally to each user of the population of users. The execution of the intervention module 340 by the organization processor 310 performs the process 600.

In a retrieving step 610, as shown in FIG. 6, the organization processor 310 executes the intervention module 340 to retrieve the quadrant 368 and the modifiers 369 of the user's cybersecurity profile 365.

As shown in FIG. 1, the organization database 350 stores, in addition to the user profile 360 of each user, a plurality of discriminated cybersecurity interventions 380. In the shown embodiment, the discriminated cybersecurity interventions 380 include a plurality of discriminated sets of training 382 and a plurality of discriminated sets of installations 388.

The discriminated sets of training 382, as shown in FIG. 1, vary in both a type 384 of cybersecurity training and an approach 386 to cybersecurity training. The types 384, for example, can include a training of types of threats, a training on best practices, training particular to certain applications such as email, or any other type of training on aspects of cybersecurity known to those with ordinary skill in the art. For each type 384 of training, a plurality of approaches 386 to cybersecurity training are stored with the discriminated cybersecurity interventions 380. The approaches 386 to cybersecurity training are each stored in association with one of the quadrants 368a, 368b, 368c, 368d and vary among these quadrants 368a, 368b, 368c, 368d. For example, in association with the first quadrant 368a, the approach 386 to cybersecurity training may focus on involving the user in exploring and setting cybersecurity rules, focusing on the user voluntarily adopting the rules before they follow the rules. For example, in association with the second quadrant 368b, the approach 386 to cybersecurity training may focus on helping the user understand a risk-reward tradeoff of following cybersecurity rules. For example, in association with the third quadrant 368c, the approach 386 to cybersecurity training may focus on convincing the user of a high risk of detection if they break cybersecurity rules. For example, in association with the fourth quadrant 368d, the approach 386 to cybersecurity training may focus on a more traditional cybersecurity training, explaining the risk and the rule, testing for knowledge, and reinforcing the value to the organization. These embodiments are merely exemplary, as the particular approach 386 to training for each quadrant 368a, 368b, 368c, 368d may vary from that described above provided the approach 386 is designed to cater to the characteristics of that quadrant 368a, 368b, 368c, 368d.

The discriminated sets of installations 388 shown in FIG. 1, for example, can include software limiting access of the user to portions of the organization system 300 and the network 200, software limiting control of the user of portions of the organization system 300 and the network 200, software monitoring keystrokes or screen scrapes of user activity, or implementing stronger system access and control parameters for selected users and including any other form of software, firmware, or hardware cybersecurity installation known to those with ordinary skill in the art. The installations 388 are each stored in the discriminated cybersecurity interventions 380 in association with a certain severity and/or a certain type of incident 390, as will be described in greater detail below.

In a training determination step 620, as shown in FIG. 6, the organization processor 310 executes the intervention module 340 to determine a discriminated set of training 382 that corresponds to the quadrant 368 of the user's cybersecurity profile 365. The intervention module 340 retrieves the quadrant 368 from the user's cybersecurity profile 365 and compares the quadrant 368 to the types 384 and approaches 386 in the discriminated sets of training 382. The intervention module 340 selects the discriminated set of training 382 based on the desired type 384 and selects the approach 386 for the type 384 based on the stored association with the quadrant 368 of the user's cybersecurity profile 365. The organization processor 310 executes the intervention module 340 to store the discriminated set of training 382 as a set of training 372 in a plurality of cybersecurity measures 370 stored in the user profile 360. The set of training 372 includes a type 374 and an approach 376 corresponding, respectively, to the discriminated type 384 and the discriminated approach 386 of the determined discriminated set of training 382 corresponding to the user's cybersecurity profile 365.

In a training implementation step 630, shown in FIG. 6, the organization processor 310 executes the intervention module 340 to retrieve the set of training 372 from the cybersecurity measures 370 of the user profile 360 and implement the necessary types 374 and approach 376 of training for the user by scheduling and communicating the types 374 and approach 376 to the user device 100 of the user.

After the set of training 372 discriminated for the user has been implemented, in an incident association step 640, the organization processor 310 executes the incident module 342 to determine if the user has been associated with an incident 390 of concern detected by existing cybersecurity practices of the organization 300 known to those with ordinary skill in the art. The incident 390 of concern may alternatively be referred to as an indication of compromise. In an embodiment, the incident module 342 receives the incident 390 from the network 200 through the organization communication unit 330. In another embodiment, the cybersecurity practices detecting the incident 390 are executed within the organization 300 and the incident module 342 receives the incident 390 from within the organization 300. The incident 390, for example, may represent a third-party having gained access to a portion of the network 200, malware having entered the network 200, or any other third-party inspired cybersecurity threat to the organization 300. The data of the incident 390 received by the incident module 342 includes an indication of the user in the organization 300 associated with the incident 390. The organization 300 considers a plurality of incidents 390 at any given time; a large organization 300, for example, may have hundreds of incidents 390 open for investigation at any given time.

If the incident module 342 determines that the user has not been associated with an incident 390 following the implementation of the training 372 discriminated for the user, the incident module 342 continues to monitor whether the user is associated with any incidents 390 in an incident monitoring step 650.

If the incident module 342 determines that the user has been associated with an incident 390 following the implementation of the training 372 discriminated for the user, the intervention module 340 determines a discriminated set of installations 388 in an installation determination step 660. As described above, the discriminated sets of installations 388 are stored in the discriminated cybersecurity interventions 380 each in association with a certain severity threshold and/or a certain type of incident 390. The organization 300 may assign a severity to the incident 390 based, for example, on a dollar amount at risk or any other factor of the organization 300. In an embodiment, the intervention module 340 determines a discriminated set of installations 388 imposing the highest access and control limits when the incident 390 associated with the user exceeds the highest severity threshold. The type of incident 390 indicates what tendency of a user, for example a rule breaking or a risk tolerance tendency as shown in FIG. 5, is correlated with that incident 390. In an embodiment, the intervention module 340 determines a discriminated set of installations 388 imposing the highest access and control limits when the type of incident 390 associated with the user most corresponds to the user's cybersecurity profile 365. For example, the intervention module 340 determines a discriminated set of installations 388 imposing the highest access and control limits when the type of incident 390 is correlated with rule breaking and the user's second score 367 indicates a high rule breaking tendency. These embodiments are merely exemplary, the discriminated sets of installations 388 could be associated with different combinations of severity thresholds and types of incidents 390 as necessary. The organization, in an embodiment, can set the association of each of the plurality of discriminated sets of installations 388 with severity thresholds and types of incidents 390 in the intervention module 340.

The intervention module 340 determines a discriminated set of installations 388 in the step 660 when the training 372 discriminated and implemented for the user is not having the intended effect and incidents 390 continue to occur. The organization processor 310 executes the intervention module 340 to store the discriminated set of installations 388 as a set of installations 378 in the plurality of cybersecurity measures 370 stored in the user profile 360.

In an installation implementation step 670, shown in FIG. 6, the organization processor 310 executes the intervention module 340 to retrieve the set of installations 378 from the cybersecurity measures 370 of the user profile 360 and implement the installations 378 by, for example, initiating monitoring and/or limiting the user's control and access to the network 200.

In the system for implementing cybersecurity interventions shown in FIG. 1 and described herein, a user's on-job inclination to limit or exacerbate cybersecurity risks posed by third parties is determined without the use of potentially impermissibly or inappropriately discriminatory demographic information. Further, the determination of a cybersecurity risk likelihood for each user permits implementation of the discriminated cybersecurity interventions, efficiently allocating cybersecurity resources where they are most needed and promoting adherence to cybersecurity on a personalized level, thereby decreasing the time and cost necessary to implement effective cybersecurity protection for an organization.

In another embodiment, the system uses the cybersecurity profiles 365 to prioritize cybersecurity investigations of the organization 300. A process 700 for prioritizing cybersecurity investigations, as shown in FIG. 7, will now be described in greater detail. The execution of the incident module 342 by the organization processor 310 performs the process 700.

The process 700 shown in FIG. 7 starts when the incident module 342 receives a notice of an incident 390 as described above. The data of the incident 390 received by the incident module 342 includes an indication of the user in the organization 300 associated with the incident 390, as described above, and a plurality of weighting factors 392 that the organization 300 associates with the incident 390. The weighting factors 392 may include, in various embodiments, a relative indication of severity of the incident 390 for the organization 300, a dollar amount at risk associated with the incident 390, or any other factor of the organization 300 that can be associated with the incident 390. The incident 390 may be associated with a plurality of these weighting factors 392 or, in another embodiment, may be associated with one weighting factor 392.

In a retrieving step 710, as shown in FIG. 7, the organization processor 310 executes the incident module 342 to retrieve the cybersecurity profile 365 of the user associated with the incident 390.

In a prioritization step 720, as shown in FIG. 7, the organization processor 310 executes the incident module 342 to prioritize the incident 390 within the plurality of incidents 390 that are currently pending in the organization 300 and stored in the organization database 350. The incident module 342 prioritizes the incidents 390 based on the weighting factors 392 and the cybersecurity profile 365 associated with the incident 390. For example, an incident 390 associated with a cybersecurity profile 365 that indicates a first quadrant 368*a* and a weighting factor 392 that indicates a high dollar amount at risk receives a highest priority. An incident 390 associated with the cybersecurity profile 365 that indicates a fourth quadrant 368*d* and a low severity of risk would receive a lowest priority. For example, an incident 390 associated with a cybersecurity profile 365 that indicates a first quadrant 368*a* and a high dollar amount at risk weighting factor 392 would receive a higher priority than an incident 390 associated with a cybersecurity profile 365 that indicates a fourth quadrant 368*d* with the same high dollar amount at risk weighting factor 392.

In a storing step 730, as shown in FIG. 7, the organization processor 310 executes the incident module 342 to store the incidents 390 in the organization database 350 in order of the priority determined in the step 730.

The storing of the incidents 390 in the organization database 350 in order of priority increases an efficiency of cybersecurity investigations of the organization 300. The association of the cybersecurity profile 365 determined according to the process 500 shown in FIG. 2 with the incident 390 allows the organization 300 to prioritize incidents 390 associated with users who have been determined to be most prone to third-party inspired cybersecurity attacks, saving costs and limiting the negative effects of third-party inspired cybersecurity attacks by improving the allocation of cybersecurity investigation resources and remediations.

What is claimed is:

1. A system for implementing discriminated cybersecurity interventions in a population of users, comprising:
   a test system including a test memory and a test processor connected to the test memory, the test processor executing a plurality of algorithms on the test memory including:
      a prompt module of the test memory presenting a plurality of prompts including a first prompt set corresponding to a risk assessment and a second prompt set corresponding to a rule assessment, the first prompt set includes a positive subset of the first prompt set directed to a risk tolerance and a negative subset of the first prompt set directed to a risk aversion;
      a response module of the test memory receiving a first response set corresponding to the first prompt set and a second response set corresponding to the second prompt set from a user of the population of users;
      an evaluation module of the test memory determining a first score of the user corresponding to the first response set and the risk assessment and determining a second score of the user corresponding to the second response set and the rule assessment; and
   an organization system including an organization memory and an organization processor connected to the organization memory, the organization processor executing a plurality of algorithms on the organization memory including:
      an intervention module of the organization memory implementing a discriminated cybersecurity intervention for the user based on the first score and the second score.

2. The system of claim 1, further comprising a validation module of the organization memory comparing a validation credential of the user to a list of valid users.

3. The system of claim 2, wherein the validation credential is an element of non-demographic information of the user and the list of valid users is associated only with the element of non-demographic information of each valid user in the list of valid users.

4. The system of claim 1, wherein the second prompt set includes a positive subset of the second prompt set directed to a rule breaking and a negative subset of the second prompt set directed to a rule abiding.

5. The system of claim 4, wherein some of the prompts of the positive subset of the first prompt set and the negative subset of the first prompt set are correlated to test an affirmative and a negative of a same behavior and/or some of the prompts of the positive subset of the second prompt set and the negative subset of the second prompt set are correlated to test an affirmative and a negative of a same behavior.

6. The system of claim 4, wherein each of the positive subset of the first prompt set, the negative subset of the first prompt set, the positive subset of the second prompt set, and the negative subset of the second prompt set have a same number of prompts.

7. The system of claim 4, wherein a positive subset of the first response set corresponding to the positive subset of the first prompt set is each a positive integer, a negative subset of the first response set corresponding to the negative subset of the first prompt set is each a negative integer, a positive subset of the second response set corresponding to the positive subset of the second prompt set is each a positive integer, and a negative subset of the second response set corresponding to the negative subset of the second prompt set is each a negative integer.

8. The system of claim 7, wherein the evaluation module calculates the first score as a total sum of the positive subset of the first response set and the negative subset of the first response set and/or the evaluation module calculates the second score as a total sum of the positive subset of the second response set and the negative subset of the second response set.

9. The system of claim 8, wherein the evaluation module determines a quadrant of a cybersecurity profile of the user from a plurality of quadrants by assessing whether each of the first score and the second score is a positive value or a negative value.

10. The system of claim 9, wherein the evaluation module determines a pair of modifiers of the cybersecurity profile of the user by comparison of each of the first score and the second score to a threshold.

11. The system of claim 10, wherein the cybersecurity profile of the user is stored in a user profile associated with the user on an organization database of an organization related to the population of users.

12. The system of claim 10, wherein the intervention module determines the discriminated cybersecurity intervention from a plurality of discriminated cybersecurity interventions having a plurality of discriminated sets of training differing in an approach to training, the intervention module determines the approach to training of the plurality of discriminated sets of training based on the quadrant of the cybersecurity profile of the user.

13. The system of claim 12, wherein the plurality of discriminated cybersecurity interventions have a plurality of discriminated sets of installations differing in an access, a control, and/or a monitoring for the user, the intervention module determines a discriminated set of installations of the plurality of discriminated sets of installations based on an incident associated with the user.

14. The system of claim 9, wherein, if the first score and/or the second score are below a threshold, the evaluation module determines the quadrant by presenting a choice of the quadrant to the user.

15. The system of claim 1, wherein each of the plurality of prompts is presented in a context of an on job behavior.

16. The system of claim 1, wherein each of a plurality of responses of the first response set and the second response set reflects an agreement or a disagreement with one of the plurality of prompts on a six point scale.

17. The system of claim 1, wherein the first response set and the second response set are each stored in a user profile associated with the user on an organization database of an organization related to the population of users.

18. The system of claim 1, wherein the intervention module determines the discriminated cybersecurity intervention from a plurality of discriminated cybersecurity interventions having a plurality of discriminated sets of training differing in an approach to training.

19. The system of claim 18, wherein the plurality of discriminated cybersecurity interventions have a plurality of discriminated sets of installations differing in an access, a control, and/or a monitoring for the user.

20. The system of claim 19, wherein the intervention module stores the discriminated cybersecurity intervention determined for the user as a plurality of cybersecurity measures in a user profile associated with the user.

21. The system of claim 20, wherein the user profile is stored on an organization database of an organization related to the population of users.

22. A method for implementing cybersecurity interventions in a population of users, comprising:
presenting a plurality of prompts including a first prompt set corresponding to a risk assessment and a second prompt set corresponding to a rule assessment, the first prompt set includes a positive subset of the first prompt set directed to a risk tolerance and a negative subset of the first prompt set directed to a risk aversion;
receiving a first response set corresponding to the first prompt set and a second response set corresponding to the second prompt set from a user of the population of users;
determining a first score of the user corresponding to the first response set and the risk assessment and determining a second score of the user corresponding to the second response set and the rule assessment; and
implementing a discriminated cybersecurity intervention for the user based on the first score and the second score.

23. A system for prioritizing cybersecurity investigations in an organization, comprising:
a test system including a test memory and a test processor connected to the test memory, the test processor executing a plurality of algorithms on the test memory including:
a prompt module of the test memory presenting a plurality of prompts including a first prompt set corresponding to a risk assessment and a second prompt set corresponding to a rule assessment, the first prompt set includes a positive subset of the first prompt set directed to a risk tolerance and a negative subset of the first prompt set directed to a risk aversion;
a response module of the test memory receiving a first response set corresponding to the first prompt set and a second response set corresponding to the second prompt set from a user of the population of users;
an evaluation module of the test memory determining a first score of the user corresponding to the first response set and the risk assessment and determining a second score of the user corresponding to the second response set and the rule assessment; and
an organization system including an organization memory and an organization processor connected to the organization memory, the organization processor executing a plurality of algorithms on the organization memory including:
an incident module of the organization memory prioritizing a plurality of incidents of the organization based on the first score and the second score of the users associated with each of the incidents.

24. The system of claim 23, wherein the incidents are stored on an organization database of the organization in order of priority.

\* \* \* \* \*